US012630745B2

(12) United States Patent
Chang et al.

(10) Patent No.: US 12,630,745 B2
(45) Date of Patent: May 19, 2026

(54) RADIATION CURABLE PRIMER ADHESIVE

(71) Applicant: WORTHEN INDUSTRIES, Nashua, NH (US)

(72) Inventors: Bob Chang, Nashua, NH (US); Vincent Chevalier, Nashua, NH (US)

(73) Assignee: Worthen Industries, Nashua, NH (US)

( * ) Notice: Subject to any disclaimer, the term of this patent is extended or adjusted under 35 U.S.C. 154(b) by 833 days.

(21) Appl. No.: 17/500,369

(22) Filed: Oct. 13, 2021

(65) Prior Publication Data

US 2022/0041892 A1     Feb. 10, 2022

Related U.S. Application Data

(60) Division of application No. 16/238,829, filed on Jan. 3, 2019, now Pat. No. 11,174,414, which is a continuation of application No. PCT/US2017/040793, filed on Jul. 6, 2017.

(60) Provisional application No. 62/359,038, filed on Jul. 6, 2016.

(51) Int. Cl.
| | |
|---|---|
| *C09J 4/06* | (2006.01) |
| *B32B 7/12* | (2006.01) |
| *B32B 27/30* | (2006.01) |
| *C08F 2/44* | (2006.01) |
| *C08F 2/48* | (2006.01) |
| *C09D 4/00* | (2006.01) |
| *C09J 5/00* | (2006.01) |
| *C09J 133/00* | (2006.01) |
| *C09J 133/12* | (2006.01) |
| *C09J 133/14* | (2006.01) |
| *C09J 167/00* | (2006.01) |
| *C09J 175/14* | (2006.01) |

(52) U.S. Cl.
CPC .................. *C09J 4/06* (2013.01); *B32B 7/12* (2013.01); *B32B 27/306* (2013.01); *C08F 2/44* (2013.01); *C08F 2/48* (2013.01); *C09D 4/00* (2013.01); *C09J 5/00* (2013.01); *C09J 133/00* (2013.01); *C09J 133/12* (2013.01); *C09J 133/14* (2013.01); *C09J 167/00* (2013.01); *C09J 175/14* (2013.01); *B32B 2437/00* (2013.01); *C09J 2301/416* (2020.08); *C09J 2423/046* (2013.01); *C09J 2427/00* (2013.01); *C09J 2431/006* (2013.01); *C09J 2433/00* (2013.01); *C09J 2467/00* (2013.01); *C09J 2475/00* (2013.01)

(58) Field of Classification Search
CPC ..... C09J 4/06; C09J 5/00; C09J 133/00; C09J 133/12; C09J 133/14; C09J 167/00; C09J 175/14; C09J 2301/416; C09J 2423/046; C09J 2427/00; C09J 2431/006; C09J 2433/00; C09J 2467/00; C09J 2475/00; C09J 151/08; B32B 7/12; B32B 27/306; C08F 2/44; C08F 2/48; C08F 255/023; C08F 265/06
See application file for complete search history.

(56) References Cited

U.S. PATENT DOCUMENTS

| | | | |
|---|---|---|---|
| 3,325,444 A | 6/1967 | Best et al. | |
| 3,741,253 A | 6/1973 | Brax et al. | |
| 3,808,293 A | 4/1974 | Garrison | |
| 4,822,838 A | 4/1989 | Watanbe et al. | |
| 5,124,381 A | 6/1992 | Ward | |
| 5,166,254 A | 11/1992 | Nickle et al. | |
| 5,258,225 A | 11/1993 | Katsamberis | |
| 5,314,748 A | 5/1994 | Mazurek | |
| 5,492,963 A | 2/1996 | Ozawa et al. | |
| 6,214,460 B1 | 4/2001 | Bluem | |
| 6,500,877 B1 | 12/2002 | Krohn | |
| 8,629,229 B2 | 1/2014 | Hood | |
| 8,865,312 B2 | 10/2014 | Tasaka et al. | |
| 2004/0152799 A1 | 8/2004 | Miller et al. | |
| 2005/0147919 A1 | 7/2005 | Kunz et al. | |
| 2006/0247326 A1 | 11/2006 | Henke et al. | |
| 2007/0184742 A1 | 8/2007 | Coulson | |
| 2008/0152829 A1* | 6/2008 | Dean ........................ | C09D 7/42 427/508 |
| 2008/0299478 A1 | 12/2008 | Bayley et al. | |
| 2010/0221552 A1 | 9/2010 | Ishida | |

(Continued)

FOREIGN PATENT DOCUMENTS

| | | |
|---|---|---|
| EP | 0544052 B1 | 9/1996 |
| EP | 0910965 | 4/1999 |

(Continued)

OTHER PUBLICATIONS

"N-vinyl-caprolactam", Ultrus/Prospector (https://www.ulprospector.com/en/na/Coatings/Detail/3821/127329/N-Vinyl-caprolactam-NVC) (No Date).*

(Continued)

*Primary Examiner* — Jessica M Roswell
(74) *Attorney, Agent, or Firm* — Lambert Shortell & Connaughton; David J. Connaughton, Jr.; Justin P. Tinger

(57)     ABSTRACT

The present invention involves a 100% solids, radiation curable adhesive formulation for adhesion to EVA. This formulation may have varying compositions, as discussed in detail herein. However primarily the composition may comprise at least a monomer, and a chlorinated additive. Photo initiators may be used to allow for low temperature UV or other radiation curing. Other additives may be used to enhance functional features in various ways. In use, the present invention may be coated on a surface of EVA and then cured, and may be adhered to a substrate using only a layer of adhesive on the substrate, in contrast to the structures of the prior art, which require at least two sided adhesive application, among other complexities.

8 Claims, 1 Drawing Sheet

(56) References Cited

U.S. PATENT DOCUMENTS

| | | |
|---|---|---|
| 2012/0058317 A1 | 3/2012 | Seung |
| 2013/0078460 A1 | 3/2013 | Tasaka |
| 2013/0101861 A1* | 4/2013 | Cao .......................... E04F 15/12 |
| | | 522/78 |
| 2013/0273359 A1 | 10/2013 | Arndt |
| 2015/0190331 A1 | 7/2015 | Chang |

FOREIGN PATENT DOCUMENTS

| | | |
|---|---|---|
| EP | 1686155 | 8/2006 |
| WO | 1998015601 | 4/1998 |
| WO | 2014006189 | 1/2014 |

OTHER PUBLICATIONS

"Beta-Carboxyethyl Acrylate", Polysciences (https://www.polysciences.com/default/beta-carboxyethyl-acrylate-98-active) (No Date).*
European Search Opinion of Feb. 21, 2020, EPO App. No. 17824844.9.

* cited by examiner

Apply Composition to an EVA Shoe Sole

Expose Composition to UV Radiation to Cure

Apply Polyurethane Adhesive to Material to be Bonded to EVA Shoe Sole

Bond EVA Shoe Sole and Material via Polyurethane Adhesive

RADIATION CURABLE PRIMER ADHESIVE

BACKGROUND OF THE INVENTION

Field of the Invention

The present invention relates generally to primers and adhesives for Ethylene-vinyl acetate (EVA). More particularly the present invention relates to 100% solids compositions that function as one or both of an adhesive and primer on an EVA surface.

Description of Related Art

Working primers for EVA have traditionally been solvent borne. There are a few "waterborne" versions and also radiation curable versions, but all actually contain some level of solvent. Additionally, traditional working primers require a direct coat of adhesive on top of the primer in order to function. Hot melt applications require high levels of heat, and lead to additional processing time when cooling.

Therefore, what is needed is a 100% solids formulation that may eliminate the need for solvent usage that may also function as an adhesive without the additional primer layer.

SUMMARY OF THE INVENTION

The subject matter of this application may involve, in some cases, interrelated products, alternative solutions to a particular problem, and/or a plurality of different uses of a single system or article.

In one aspect of the present invention, a 100% solids composition operable at room temperature and capable of radiation curing is provided. This composition, and the various embodiments of it disclosed herein, is particularly suited for use in bonding EVA to a substrate. The composition has a monomer, a chlorinated compound, and a photo-initiator allowing radiation curing. In one embodiment of this aspect, the monomer is selected to be at least one of a (meth)acrylate monomer and (meth)acrylate functional urethane oligomer. In one embodiment of this aspect, the chlorinated compound is selected to be at least one of a chlorinated polyester, chlorinated rubber, and chlorinated polyolefin.

In a particular embodiment of this aspect, the composition may have 10-50% hexanediol diacrylate as the monomer; 10-40% chlorinated polyester as the chlorinated compound; 10-30% cyclic aliphatic diacrylate; 1-5% acidic methacrylate; and 1-5% photoinitiator.

In another embodiment of this aspect, the composition may have 10-50% hexanediol diacrylate as the monomer; 10-40% chlorinated polyester as the chlorinated compound; 10-30% 5-35% cyclic aliphatic diacrylate; 1-5% acidic methacrylate; modified epoxy diacrylate; and 1-5% photoinitiator.

In yet another embodiment of this aspect, the composition may have 60-99% methyl methacrylate as the monomer; 0-20% hexanediol diacrylate; 10-20% chlorinated polyolefin as the chlorinated compound; 1-20% acidic methacrylate; 1-5% NVC (N-vinylcaprolactam); and 1-5% photoinitiator.

In a particular embodiment of this aspect, the composition may have 10-30% hexanediol diacrylate as the monomer; 10-70% acrylic polymer; 10-20% chlorinated polyester as the chlorinated compound; 1-5% acidic methacrylate; and 1-5% photoinitiator.

In yet another embodiment of this aspect, the composition may have 10-40% hexanediol diacrylate as the monomer;

10-40% chlorinated polyester as the chlorinated compound; 10-20% cyclic aliphatic diacrylate; 10-20% BCEA (beta-carboxyethylacrylate); 1-10% NVC; and 1-5% photoinitiator.

In still another embodiment of this aspect, the composition may have 10-40% hexanediol diacrylate as the monomer; 10-40% chlorinated polyester resin as the chlorinated compound; 1-5% acidic methacrylate; 10-20% SCEA; 1-10% NVC; and 1-5% photoinitiator.

In another embodiment of this aspect, the composition may comprise 10-50% of the monomer, the monomer being at least one of hexanediol diacrylate and methyl methacrylate. In a further particular example of this embodiment, the composition may have plurality of different (meth)acrylate functional urethane oligomers, the combination of the plurality of different (meth)acrylate functional urethane oligomers making up 11-75% of the composition. In yet another particular example of this embodiment, the composition may comprise 10-30% cyclic aliphatic diacrylate. In another particular example of this embodiment, the composition may comprise the chlorinated compound in a composition of 10-40%. This embodiment may also have a plurality of different (meth)acrylate functional urethane oligomers, which may comprise cyclic aliphatic diacrylate and acidic methacrylate. This embodiment may also have a plurality of oligomers which comprises cyclic aliphatic diacrylate, acidic methacrylate, and modified epoxy diacrylate.

In an embodiment of use this composition aspect, which includes, and is not limited to, use of any of the above noted composition embodiments of the aspect of the inventive composition, the composition may be used in a method of adhering EVA to a substrate. This embodiment of use may have the steps of: obtaining the substrate; obtaining the ethylene-vinyl acetate; applying the composition of the present invention at room temperature to the ethylene-vinyl acetate; curing the composition of claim 1 using a radiation; contacting the ethylene-vinyl acetate having the composition of claim 1 applied to the substrate, the substrate and composition-coated ethylene-vinyl acetate being bonded together by an adhesive applied to the substrate. As noted, the composition used for this method of use embodiment may be any of the above noted embodiments, and/or any composition disclosed or described in the below detailed description, claims, abstract, and FIGURES.

BRIEF DESCRIPTION OF THE DRAWINGS

FIG. 1 provides a flow chart of an embodiment of use of the present inventive composition.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

This invention includes an adhesive/primer composition for use with EVA having a 100% solids composition with 0% solvent added and may function as the adhesive itself so only the contact substrate requires an adhesive coat. The composition of the present invention removes unnecessary and potentially harmful VOC's from the worker and environment, eliminates the need for high temperatures that are required of hot-melt adhesives and their resulting difficulties, and also removes a step in the adhesion process of footwear manufacturing. The present invention is usable at ambient room temperatures without any added temperature adjusting steps during use.

Generally, the present invention concerns a 100% solids, radiation curable adhesive formulation for adhesion to EVA. Further, in some embodiments, the present invention may be used as a primer as well as, or in alternative to adhesive. This formulation may have varying compositions, as discussed in detail below. However primarily the composition may comprise at least a monomer, and a chlorinated additive. Photo initiators may be used to allow for low temperature UV or other radiation curing. Other additives may be used to enhance functional features in various ways.

This 100% solids formulation does not require any solvents, as is required of the prior art. The formulations contemplated herein provide a number of advantages over the existing solutions. For example, the invention provides both an improved product and an improvement in manufacturing. The 100% solids composition uses no volatile organic compounds (VOCs) thereby making it a "greener" technology. Eliminating VOCs also creates a less hazardous and less expensive implementation. Further, the present invention eliminates steps from manufacturing by allowing room temperature, solvent free curing, and by eliminating the need for an adhesive directly applied to the cured adhesive/primer. Instead, an adhesive is only needed on the substrate to be applied to the EVA that is coated with the adhesive/primer of the present invention. This adhesive may be the composition of the present invention, or another adhesive. In many embodiments, a second adhesive is not needed, and the present inventive composition is sufficient to bond EVA to the substrate. These eliminated steps can result in cost savings and also energy savings (such as removal of an oven or less energy powering an incinerator), which in turn leads to a "greener" technology providing both a safer work environment and cost savings.

Speaking generally, in many, but not all embodiment of the present invention, the composition may include either an acrylate or methacrylate, diluents, and a photo initiator. For adhesion promotion to EVA, a chlorinated compound may also be necessary, such as chlorinated polyester or chlorinated polyolefin.

Typically, the present invention composition requires a monomer, such as a (meth)acrylate monomer or (meth)acrylate functional urethane oligomer. Further, the composition requires a chlorinated compound such as a chlorinated polyester, chlorinated rubber, and/or chlorinated polyolefin. Additionally, the photo initiator allows for curing via, for example, UV radiation.

As noted, the primary features of the present inventive composition are the a monomer, selected to be at least one of a (meth)acrylate monomer and (meth)acrylate functional urethane oligomer; a chlorinated compound selected to be at least one of a chlorinated polyester, chlorinated rubber, and chlorinated polyolefin; and a photo initiator. The specific compositions disclosed herein may, in many cases, have different additives interchanged or used in other embodiments, without straying from the scope of the present invention. The following non-limiting examples provide approximate ranges of 100% solids compositions of the present invention that have been used to successfully bind EVA to a contact substrate:

Example 1

| HDDA (hexanediol diacrylate) - monomer | 10-50% |
|---|---|
| Ebecryl 438 - chlorinated polyester | 10-40% |
| Ebecryl 130 - cyclic aliphatic diacrylate | 10-30% |
| Ebecryl 168 - acidic methacrylate | 1-5% |
| Irgacure 500 | 1-5% |

Example 2

| HDDA (hexanediol diacrylate) - monomer | 10-50% |
|---|---|
| Ebecryl 436 - chlorinated polyester | 10-40% |
| Ebecryl 130 - cyclic aliphatic diacrylate | 10-30% |
| Ebecryl 168 - acidic methacrylate | 1-5% |
| Ebecryl 3418 - modified epoxy diacrylate | 5-35% |
| Irgacure 500 | 1-5% |

Example 3

| MMA (Methyl Methacrylate - monomer | 60-99% |
|---|---|
| HDDA (hexanediol diacrylate) - monomer | 0-20% |
| DX-530p - chlorinated polyolefin | 1-20% |
| Ebecryl 168 - acidic methacrylate | 0-20% |
| NVC | 1-5% |
| Irgacure 500 | 1-5% |

Example 4

| HDDA (hexanediol diacrylate) - monomer | 10-30% |
|---|---|
| Ebecryl 1710 - acrylic polymer | 10-70% |
| Ebecryl 438 - chlorinated polyester | 10-20% |
| Ebecryl 168 - acidic methacrylate | 1-5% |
| Irgacure 500 | 1-5% |

Example 5

| HDDA (hexanediol diacrylate) - monomer | 10-40% |
|---|---|
| Ebecryl 438 - chlorinated polyester | 10-40% |
| Ebecryl 130 - cyclic aliphatic diacrylate | 10-20% |
| βCEA | 10-20% |
| NVC | 1-10% |
| Irgacure 500 | 1-5% |

Example 6

| HDDA (hexanediol diacrylate) - monomer | 10-40% |
|---|---|
| Genomer 6050 - chlorinated polyester resin | 10-40% |
| Ebecryl 168 - acidic methacrylate | 1-5% |
| βCEA | 10-20% |
| NVC | 1-10% |
| Irgacure 500 | 1-5% |

Example 7

| Genomer 1120 ( cyclic mono-functional acrylate) | 75-90% |
| Pergut S20 (chlorinated rubber) | 8-20% |
| Irgacure 500 | 0-5% |
| βCEA | 0-5%% |
| CN 780 | 0-5% |

Generally, it is known in the art that chlorinated materials such as chlorinated polyester or chlorinated polyolefins are designed to promote adhesion to specific substances. These substances include polyester, polypropylene, and other thermoplastic olefins (TPO). EVA is different from and not related to these categories of materials. Therefore, the compositions of the present invention demonstrated the unexpected result of being highly effective with use on EVA as a primer and adhesive.

It is believed that these formulations differ from current commercial formulations in omitting tri-functional acrylates and instead using mono and di-functional acrylate monomers. This allows the primer to retain thermoplasticity which allows the cured primer to flow more and wet with the PU/adhesive coated substrate after heat activation compared to prior art compositions. The tri-functional acrylates cross-link more than mono and di-functional acrylates, thus not being very flowable when attempting to bond to the heat activated adhesive surface. It is notable as well that EVA primers in the prior art utilize a solvent base, and are not 100% solids compositions.

Additionally, compared to the existing solvent borne formulations, this invention is also thicker, because the solvent borne formulations tend to lay down only a mono-layer as the solvent is driven off, leaving only solids. With 100% solid formulations, everything disposed on the EVA material remains. This allows better surface wet-out and penetration at the primed surface/adhesive interface. Overall, there is much more contact between layers compared to a thin monolayer with prior art solvent based compositions.

In one embodiment of use, as illustrated in FIG. 1, the composition may be applied to an EVA surface, such as a sole of a shoe. This application may be by, for example, spraying, brushing, rolling, or the like. The inventive composition may then be radiation cured-typically UV cured. Once cured the surface is ready to be bonded with an adhesive, for example a polyurethane adhesive-coated upper shoe portion. This adhesive is then used to join the EVA with the mating surface. Optionally, an adhesive may be coated over the cured adhesive/primer of the present invention, but this additional adhesive is not required. Not including this second adhesive application cuts out a step when compared to the prior art process. It should be understood that this embodiment of use may use any variation of the inventive compositions disclosed herein without straying from the scope of this invention.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth. It is further to be understood that various aspects and embodiments may include elements and/or components that are similarly and equally applicable to other aspects and embodiments, without being limited to the particular aspect or embodiment to which they are described.

What is claimed is:

1. A 100% solids composition operable at room temperature and capable of radiation curing comprising:
   a monomer, selected to be at least one of a (meth)acrylate monomer and (meth)acrylate functional urethane oligomer;
   a chlorinated compound selected to be at least one of a chlorinated polyester, chlorinated rubber, and chlorinated polyolefin;
   wherein the chlorinated compound making up 10-40% of the composition;
   a photo initiator making up to 5% of the composition;
   further comprising a plurality of different (meth)acrylate functional urethane oligomers, the plurality of different (meth)acrylate functional urethane oligomers making up 11-75% of the composition;
   wherein the plurality of different (meth)acrylate functional urethane oligomers comprises cyclic aliphatic diacrylate and acidic methacrylate.

2. The 100% solids composition of claim 1 consisting of:
   10-50% hexanediol diacrylate as the monomer;
   chlorinated polyester as the chlorinated compound;
   10-30% cyclic aliphatic diacrylate and 1-5% acidic methacrylate as the plurality of different (meth)acrylate functional urethane oligomers; and
   1-5% photoinitiator.

3. The 100% solids composition of claim 1 wherein the plurality of different (meth)acrylate functional urethane oligomers further comprises modified epoxy diacrylate.

4. The 100% solids composition of claim 3 consisting of:
   10-50% hexanediol diacrylate as the monomer;
   chlorinated polyester as the chlorinated compound;
   10-30% cyclic aliphatic diacrylate, 1-5% acidic methacrylate, and 5-35% modified epoxy diacrylate as the plurality of different (meth)acrylate functional urethane oligomers
   1-5% photoinitiator.

5. The 100% solids composition of claim 1 comprising 10-30% cyclic aliphatic diacrylate.

6. A 100% solids composition operable at room temperature and capable of radiation curing comprising:
   a monomer, selected to be at least one of a (meth)acrylate monomer and (meth)acrylate functional urethane oligomer; the composition comprising 10-50% of the monomer, the monomer being at least one of hexanediol diacrylate and methyl methacrylate;
   wherein the monomer is mono- or di-functional acrylate monomer, and omits tri-functional acrylates;
   a chlorinated compound selected to be at least one of a chlorinated polyester, chlorinated rubber, and chlorinated polyolefin;
   a photo initiator making up to 5% of the composition; and
   further comprising 10-30% cyclic aliphatic diacrylate.

7. The 100% solids composition of claim 6 further comprising a plurality of different (meth)acrylate functional urethane oligomers, the plurality of different (meth)acrylate functional urethane oligomers making up 11-75% of the composition.

8. The 100% solids composition of claim 6 wherein the monomer is a mono-functional acrylate monomer.

* * * * *